No. 740,665. PATENTED OCT. 6, 1903.
A. LARSEN.
HORSESHOE PAD.
APPLICATION FILED OCT. 24, 1902.
NO MODEL.

Witnesses:
Carl H Crawford
W. L. Hall

Inventor:
Andrü Larsen
by Poole & Brown
his Attorneys

No. 740,665. Patented October 6, 1903.

UNITED STATES PATENT OFFICE.

ANDRŮ LARSEN, OF CHICAGO, ILLINOIS.

HORSESHOE-PAD.

SPECIFICATION forming part of Letters Patent No. 740,665, dated October 6, 1903.

Application filed October 24, 1902. Serial No. 128,559. (No model.)

*To all whom it may concern:*

Be it known that I, ANDRŮ LARSEN, of Chicago, in the county of Cook and State of Illinois, have invented certain new and useful Improvements in Horseshoe-Pads; and I do hereby declare that the following is a full, clear, and exact description thereof, reference being had to the accompanying drawings, and to the letters of reference marked thereon, which form a part of this specification.

This invention relates to improvements in horseshoe-pads, and embodies as a part of the construction thereof certain of the features set forth in my prior application for United States Letters Patent, Serial No. 101,145, filed June 14, 1902.

The invention relates also to the combination with a horseshoe-pad of a special form of horseshoe.

Among the objects of the invention is to provide a pad which will protect the softer parts of the foot of the animal from injury due to contact of the foot with nails, cobblestones, and the like found on the roadway, and, secondly, to provide a cushioning means adapted to relieve the limb of the animal from jars due to the contact of the foot with the roadway.

The invention consists of the matters hereinafter set forth, and more particularly pointed out in the appended claims.

Figure 1:
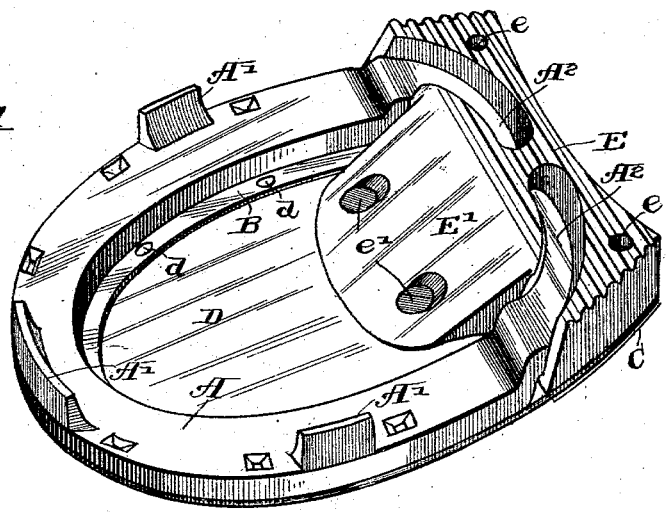
Figure 2:
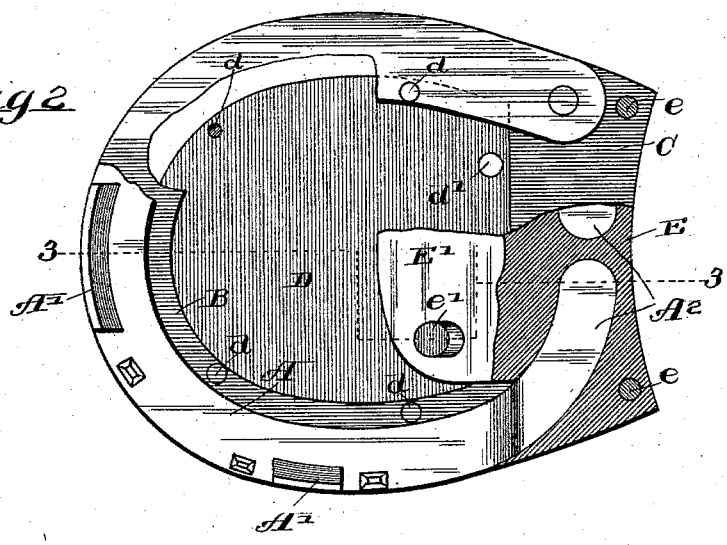
Figure 3:
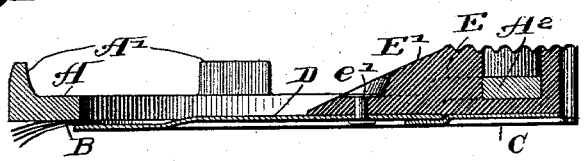

In the drawings, Figure 1 is a bottom perspective view of a horseshoe embodying my invention. Fig. 2 is a bottom plan view, with parts broken away, of said shoe. Fig. 3 is a longitudinal vertical section of said shoe, taken on line 3 3 of Fig. 2.

As shown in the drawings, A designates the bar of a horseshoe provided with holding-calks A'. B designates a pad which fits on top of the shoe and is adapted to be interposed between the shoe and the foot of the animal to which said shoe is attached. Said pad embraces a flat strip or rim of flexible material made of the same general shape as that of the shoe-bar and is of somewhat greater width than said bar, so as to project inwardly from said bar, as clearly shown in Figs. 1 and 2. The said pad strip or rim is herein shown as made of laminated construction, being composed of a plurality of thin layers of canvas or like fibrous material, as shown in Fig. 3. Said layers are made waterproof by being permeated with a suitable waterproof material, and preferably said waterproof material is of an adhesive character, so as to bind or cement said layers together. Tar is a suitable material for rendering the pad waterproof and for cementing the layers thereof together. So far as certain features of the invention are concerned, the pad-rim may be of other material. The rear ends of said pad-rim are joined by a relatively wide transverse strip of metal C, and said transverse strip is curved downwardly at its longitudinal center for the purpose of affording space for the frog of the animal to which the pad is attached. The space inclosed by said pad rim and strip C is filled by a metal plate D, which is attached to the pad-rim by rivets $d$ and to the rear transverse bar by other rivets $d'$ in the manner shown in Fig. 2. Said plate D is preferably made of a soft galvanized steel and of such strength as to prevent puncture thereof by nails and sharp stones on the roadway. The metal of the plate is also preferably made sufficiently yielding to permit it to be pressed and to lie closely to the bottom of the horse's foot and prevent the accumulation of dirt between said plate and the foot, while at the same time being sufficiently rigid to hold itself in place.

The pad thus described may be used with a shoe of ordinary construction and for the same purpose as shown in my said prior application. The rim B constitutes a cushion, which is interposed between the shoe and the foot of the animal and is made of such material as to render it waterproof, and therefore to protect it against the decaying action of water. The rim also serves as a flexible part by which the plates C and D are attached to the shoe. Said central plate D of the pad affords an efficient protection to the softer parts of the foot against nails and the like, and the rear connecting-bar C greatly strengthens the pad as a whole.

In addition to the construction just described I apply to the rear end of the shoe and the under surface thereof a cushioning-body E, of rubber or like material. Said cushioning-body extends from side to side of the shoe at the rear end thereof and is attached by rivets $e\ e'$ to the pad, the body being provided with a forwardly-projecting part E', which extends forwardly between the shoe-bars and is attached to the central plate of the pad by the rivets e'. The cushioning-body is made of considerable thickness and is intended to relieve the foot of the first jar brought thereon as it strikes the roadway. The pad is made of such thickness that when the combined shoe and pad rests on the roadway or floor the shoe inclines somewhat forwardly toward the toe thereof. The cushioning-body therefore receives the first weight of the animal brought upon the shoe and serves to cushion or absorb the first impact of the shoe upon the roadway. As the weight of the animal is brought upon the shoe the toe-calk and the cushioning-body receive the first weight, and the intermediate calks are not brought into contact with the roadway until the cushioning-body has cushioned the jar of the shoe upon the roadway. The cushioning-body also prevents slipping of the shoe upon the roadway, and in order to enhance this function the lower surface of said body is preferably roughened, as shown.

The rear ends of the bars of the shoe are offset downwardly, and the offset portions $A^2$ are continued in downwardly-opening grooves in the cushioning-body E. The effect of offsetting the rear ends of the shoe and embedding the same in the body E in the manner shown is to interpose a part of the cushioning-body between the foot of the animal and the rear ends of the shoe, so that the softer part of the animal's foot will be protected against concussion against the rigid parts of the shoe. The offset ends of the shoe are curved inwardly toward each other and almost meet at their extremities, as shown in Fig. 2. The extent of the offset of the shoe-bars, however, is not sufficient to interfere with the cushioning action of that part of the body below said offset parts. In other words, the thickness of the cushioning-body below the bars is sufficient to absorb jars or blows before said rear ends of the bars are brought into contact with the roadway. If desired, the grooves which are occupied by the offset end of the shoe-bars may be filled or the cushioning-body may be molded about the rear ends of the shoe-bars.

It is obvious that the same general results will be attained if the plates C and D be made integral with each other; but inasmuch as the overlapping of said plates at their connected parts provides a very rigid structure at this part of the pad the construction shown is preferred.

An important advantage of continuing the ends of the shoe inwardly to the rear bar or plate C is that it affords a firm connection between the rear and forward ends of the pad, so as to prevent the pad breaking in front of the cushioning-body, such as would occur if the shoe be terminated in front of the cushioning-body.

An advantage of the form of pad shown, consisting of the pad-rim and the plates C and D, lies in the fact that said rim, while affording a cushioning member between the shoe and the foot, constitutes means for attaching the plate firmly to the shoe, the plate affording an efficient protection to the softer parts of the animal's foot. An important advantage of using the metal plate D is that it may be pressed closely against the foot of the animal and prevent accumulation of dirt between the same and the foot.

Changes may be made in the structural details without departing from the spirit of my invention, and I do not wish to be limited to such details except as hereinafter made the subject of specific claims.

I claim as my invention—

1. A horseshoe-pad adapted to be interposed between the hoof of the horse and the shoe, said pad comprising an outer rim made of the general contour of the shoe-bar and consisting of a plurality of thin layers of fibrous material which are permeated and cemented together by a tarry substance and a central metal plate which is attached at its margins to the inner margins of said rim and extends from the front to the rear of the pad.

2. A horseshoe-pad adapted to be interposed between the hoof of the horse and the shoe, said pad comprising an outer rim made of the general contour of the shoe-bar, and consisting of a plurality of thin layers of fibrous material which are permeated and cemented together by a tarry substance, a central metal plate which is attached at its margins to the inner margins of said rim and a transverse metal plate extending between the rear ends of said pad-rim, said transverse plate overlapping at its forward edge the rear edge of said central plate and secured thereto by rivets.

3. The combination with a shoe, of a pad applied to the upper side thereof comprising a rim of flexible material, a central metal plate attached at its margins to the inner margins of said rim, a transverse plate extending from one end of the rim to the other and rigid with the central plate, and a cushioning-body applied to the under side of the shoe at the rear end thereof and attached to the pad, the rear end of the shoe-bar being offset downwardly and embedded in said cushioning-body.

4. The combination with a shoe, of a pad applied to the upper side thereof comprising a rim of flexible material, a central metal plate attached at its margins to the inner margins of said rim, a transverse plate extending from one end of the rim to the other and rigid with the central plate, and a cushioning-body applied to the under side of the shoe at the rear end thereof and attached to the pad and to said shoe, the rear end of the shoe-bar being offset downwardly and embedded in said cushioning-body, said rear offset ends of the shoe being turned inwardly toward each other.

5. The combination with a horseshoe and a cushioning-body applied to the under side at the rear end thereof, the rear ends of the shoe-bars being offset downwardly and curved inwardly toward each other and being embedded in said cushioning-body.

In testimony that I claim the foregoing as my invention I affix my signature, in presence of two witnesses, this 18th day of October, A. D. 1902.

ANDRŬ LARSEN.

Witnesses:
TAYLOR E. BROWN,
WILLIAM L. HALL.